(12) United States Patent
Saylor (10) Patent No.: US 7,096,128 B2
(45) Date of Patent: Aug. 22, 2006

(54) PROCESS FOR THE ASSESSMENT OF GRAVITY-TYPE COLLECTION NETWORKS

(76) Inventor: David J. Saylor, 1035 W. 550 E., Westville, IN (US) 46391

( * ) Notice: Subject to any disclaimer, the term of this patent is extended or adjusted under 35 U.S.C. 154(b) by 0 days.

(21) Appl. No.: 11/054,526

(22) Filed: Feb. 9, 2005

(65) Prior Publication Data

US 2005/0177323 A1 Aug. 11, 2005

Related U.S. Application Data

(60) Provisional application No. 60/543,529, filed on Feb. 11, 2004.

(51) Int. Cl.
*G06F 19/00* (2006.01)
(52) U.S. Cl. .......................... 702/45; 702/33
(58) Field of Classification Search ................. 702/33, 702/45
See application file for complete search history.

(56) References Cited

U.S. PATENT DOCUMENTS 5,198,989 A * 3/1993 Petroff .......................... 702/48
5,821,427 A * 10/1998 Byrd ......................... 73/861.25
6,807,494 B1 * 10/2004 Schutzbach et al. .......... 702/45

* cited by examiner

*Primary Examiner*—John Barlow
*Assistant Examiner*—Douglas N. Washburn
(74) *Attorney, Agent, or Firm*—Dowell Baker, P.C.; Anthony Dowell (57) ABSTRACT

A method of evaluating a gravity-type flow conveyance system is disclosed. The method includes the steps of identifying, quantifying and totaling all upstream inflow sources to compute an anticipated flow at a plurality of access points in the system. The actual depth of flow at each access point is then measured and converted to a theoretical flow for each access point. The anticipated flow and the theoretical flow are then compared to determine whether any restrictions on flow might exist in the system and also to prioritize further inspection and repair of the system.

10 Claims, 5 Drawing Sheets

PROCESS FOR THE ASSESSMENT OF GRAVITY-TYPE COLLECTION NETWORKS

CROSS-REFERENCE TO RELATED APPLICATION

This application claims priority under 35 U.S.C. § 119(e) to U.S. Provisional Application Ser. No. 60/543,529 entitled "A Process for the Assessment of Gravity-Type Collection Networks" and filed Feb. 11, 2004, the contents of which are incorporated herein by reference.

FIELD OF THE INVENTION

The present invention relates generally to a process for evaluating the hydraulic performance of a sanitary sewer system and identifying and prioritizing portions of the system for further inspection, analysis and repair.

BACKGROUND OF THE INVENTION

To prevent water pollution and further the goals of the Clean Water Act, regulations and enforcement actions have historically focused on the output of wastewater treatment facilities. However, in recent years, the technology for treating wastewater has largely matured to the point that treatment facilities are decreasingly the source of significant water pollution. To further eliminate potential water pollution, the United States Environmental Protection Agency, municipalities and sanitary sewer system authorities have recently refocused their attention and resources on the network of pipes that transports wastewater to the treatment facility.

These piping networks may be constructed as a combined wastewater and storm water system, or dedicated exclusively to the transport of wastewater. In either case, untreated wastewater can overflow from the system into the environment. For the health of the community and environment, and to remain in compliance with the law, a sanitary sewer system authority must prevent such overflows. To retain a permit to operate a sanitary sewer system, an authority must "take all reasonable steps to minimize or prevent any discharge . . . which has a reasonable likelihood of adversely affecting human health or the environment." 40 CFR 122.41(d).

Sanitary system overflows, or SSO's, can be caused by a number of factors. The primary cause of overflows is restrictions and blockages in the sewer system, most often caused by the accumulation of debris, roots and/or grease in a sewer pipe. Although less common, underground pipes also may settle, rupture or deteriorate, especially in older collection systems. In wet weather conditions, storm water runoff may infiltrate a dedicated sanitary sewer system, or overwhelm the capacity of a combined sanitary sewer and storm water system, and cause the sanitary system to overflow. Because an SSO may result in untreated sewage being released into the environment or backing up into residential basements, municipalities and sanitary sewer system authorities seek technology and methods to identify actual and potential causes for an SSO.

In the past, municipalities and sanitary system authorities have addressed actual and potential sanitary sewer system overflows in a number of ways. Many authorities have simply built additional or redundant capacity into their piping system to prevent overflows. Studies have shown, however, that restrictions and blockages are the primary cause of overflows, not lack of capacity in the system. Thus, simply adding additional capacity leads to piping systems that are underutilized and more expensive than necessary to serve the sanitary needs of the community.

Some larger authorities have employed complex and expensive evaluation methods to identify potential causes of SSO's. These methods often include the use of expensive devices for monitoring flow at different points in the system and the employment of personnel and/or consultants to collect and analyze data from the flow monitoring devices. The data is often analyzed with proprietary software by paid consultants.

These techniques, associated devices and software, however, are often beyond the financial capacity and skill set of small and medium sized sanitary system authorities. Also, because of the cost and complexity of these evaluation methods, a complete review of the entire sanitary system is typically not performed. Thus, although general problem areas in the system may be identified, specific pipe restrictions and blockages may be missed.

In addition, due to the cost of employing data collection personnel and consultants, the review and analysis of most sanitary sewer systems is typically short lived, and usually only performed in response to a specific problem or overflow. Prior art evaluation techniques are typically project-based, specific to a particular problem and not designed for ongoing assessment of the collection network. The resultant data is typically not incorporated into the ongoing operation and maintenance procedures of the authority, and is therefore not helpful in identifying and solving future problems in the system.

In addition, because the evaluation of sanitary sewer systems has historically been project-based and in response to a specific problem or overflow, little attention has been paid to the ongoing maintenance and upkeep of the system. However, sewer system assets that are not regularly maintained will deteriorate faster, leading to higher replacement and emergency response costs. When a sewer system is regularly maintained, its lifetime can be increased and maintenance costs distributed over the lifetime of the system. Thus, a regular evaluation and maintenance program will save money in the long run, avoid unexpected and unplanned for costs and safeguard against the health risks associated with SSO's.

Accordingly, an object of the present invention is to provide an evaluation method for identifying potential causes of sanitary system overflows including restrictions and blockages in the piping system, ruptured or deteriorated pipes and sources of storm water inflow and infiltration into the system.

A further object of the present invention is to provide an evaluation method that specifically identifies problem points in the collection network and avoids the need for building additional or redundant capacity in the system.

Yet another object of the present invention is to provide an evaluation method that is inexpensive to administer and easy to understand.

An additional object of the present invention is to provide an evaluation method that can be used to evaluate the entire sanitary sewer system and that can be easily performed on an ongoing basis.

Finally, an object of the present invention is to provide an evaluation method that can be incorporated as part of an ongoing sewer system maintenance and upkeep program to prolong the life of the system and avoid unexpected and unplanned for costs.

SUMMARY OF THE INVENTION

The present invention provides an inexpensive and easily administered process for identifying potential problem points in a sanitary sewer system. The first step in the process is to obtain accurate system-wide maps of the collection system. From these maps, all accessible data collection points (manholes) are identified. For each of these points, the anticipated flow under standard conditions at each point is calculated based on normal flow rates from the customers upstream from the access point. Following the calculation of the anticipated flow at each access point, personnel measure the depth of flow at each access point under standard conditions in the field. With a knowledge of the pipe geometry at each access point, the depth of flow is converted to a theoretical flow at each access point. The theoretical flow is then divided by the anticipated flow to obtain a QRatio for each access point.

If the QRatio is significantly high (greater than 2.0), the pipe segment immediately downstream of the access point is prioritized for inspection. Also, the QRatio of all access points in the system may be easily ranked and the nearby pipe segments prioritized for inspection and maintenance. In addition, the QRatio for access points may be tracked over time to show trends of deterioration and provide a basis for prioritizing funds for proactive repair or replacement of pipes. The QRatio may also be measured during wet weather conditions and used to identify points of inflow and infiltration of storm water into the sanitary sewer system. Finally, the collected flow data and piping geometry may also be used to analyze the available capacity of specific pipe segments and prioritize maintenance and capacity additions to the system to accommodate storm conditions.

The inventive process of the present invention provides many advantages over prior art measurement and analysis processes. The process of the present invention utilizes inexpensive and simple measurement techniques, namely, a paper depth gauge, and the data can be entered and computations performed with commonly available software programs. Although less precise than more complex and expensive monitoring and evaluation systems, the inexpensive and simple process allows small and medium sized sanitary sewer system authorities to regularly survey the performance of the entire system. With this accumulated data, more detailed and expensive methods of evaluation may be utilized on identified points of concern. Limited resources are not wasted analyzing, testing and monitoring the entire system.

These and other advantages will become apparent as this specification is read in conjunction with the accompanying drawings and appended claims.

DETAILED DESCRIPTION

The process of the present invention will be described herein with reference to collecting data for a sanitary sewer system. However, unless otherwise noted, it will be understood that the sanitary sewer system described herein may be a combined sanitary and storm water system. The present invention is equally applicable to the analysis of a dedicated storm water system or any gravity-type hydraulic conveyance network.

Figure 1:
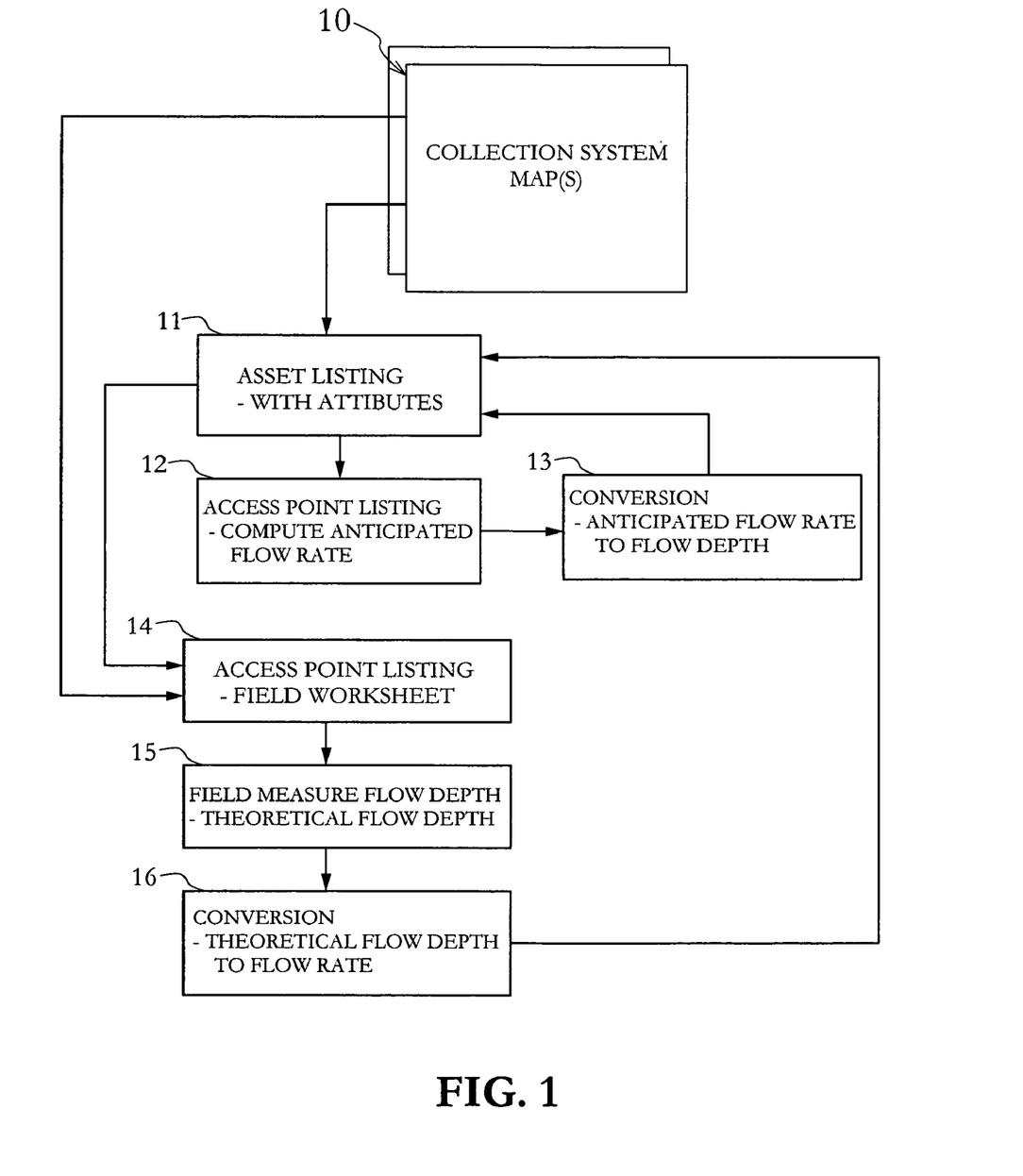
FIG. 1 is a block diagram illustrating the data collection portion of the present invention.

FIG. 1 illustrates the steps of the first portion of the inventive process of the present invention. The first step in the process is to obtain collection system maps 10 for the system to be analyzed. From these maps, the assets of the collection system (the piping that conveys waste water through the system) may be identified and listed with their attributes 11. All access points (manholes) for the system are also identified and listed 12. For each access point, an anticipated flow rate may be computed 12. Asset attributes may include material type, size of structure, flow direction, invert depth, upstream sources, performance history, etcetera.

The anticipated flow rate at each access point is computed based on the total estimated output from all sources upstream of the access point including residences, multi-family dwellings and businesses. For domestic, single family residential sources, the output for each is estimated at 300 gallons per day per sewer tap, or gpdpt. For multifamily or commercial customers, the actual gallons delivered by the water utility are used. For a given pipe segment terminated at a manhole, the anticipated flow rate $Q_A$ at any given time is derived by the following:

where, $U_r$=usage per day estimated by the number of upstream residential customers at 300 gpdpt $U_c$=usage per day from multifamily or commercial customers, estimated from water billings $G_d$=gallons per day delivered at the lowest end of a pipe segment $G_s$=flow rate in gallons per second at the pipe segment $Q_A$=anticipated flow rate in ft³/sec then:

$$G_d = Ur + Uc \text{ gallons/day, and}$$

$$G_s = G_d/86,400 \text{ sec/day, and}$$

$$Q_A = G_s/7.48 \text{ ft}^3/\text{sec}$$

or, by substitution $$Q_A = (Ur + Uc)/646,272 \text{ ft}^3/\text{sec}$$

When the number of upstream sources is determined at a given manhole, the flow rate is computed in terms of cubic feet per second. Then, for a known pipe size and surface roughness, the estimated height of flow, h, in the pipe may be calculated.

Figure 4:
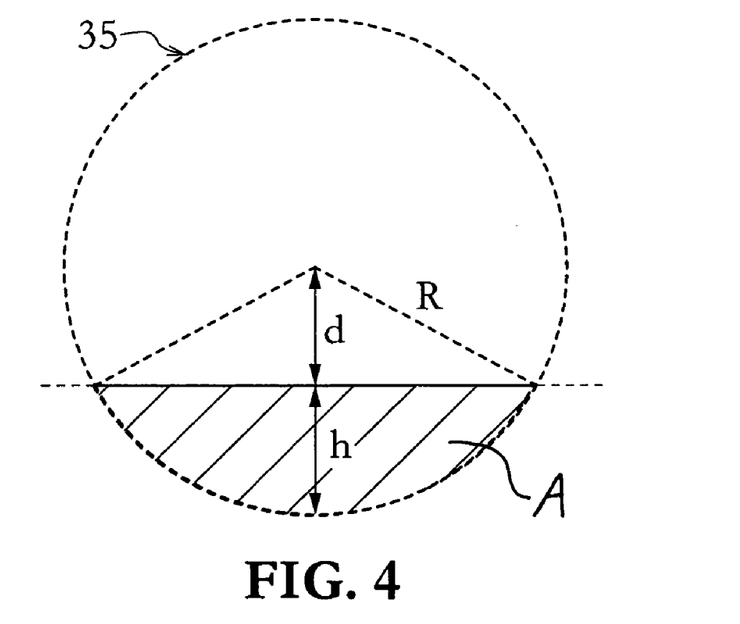
FIG. 4 is a diagrammatic view illustrating the hydraulic area of flow.

To calculate h, the flow geometry of a pipe must be considered. If the height of flow and radius of the pipe are known, the area of flow may be calculated using the following formula:

$$A \approx \frac{1}{2}\left(R * \sqrt{\left(2\sqrt{R^2 - d^2}\right)^2 + \frac{16}{3} * h^2} - 2\sqrt{R^2 - d^2} * d\right)$$

where, as shown in FIG. 4,
A = area of flow
R = radius of the pipe
d = distance from center of the pipe to the top of the flow
h = height of flow If A is known, h may be calculated by substitution. The standard Flow Rate Equation is:

$$Q = V A$$

where,
Q = rate of flow in ft$^3$/sec
V = velocity of flow in ft/sec
A = area of flow in ft$^2$ The Manning Formula offers a method to compute velocity, V.

$$V = 1.486/n \cdot R_h^{2/3} \cdot S^{1/2} V$$

where,
V = velocity of flow in ft/sec
n = pipe wall roughness coefficient
$R_h$ = pipe radius
S = energy slope, usually equal to the pipe slope Using the Manning Formula, it may be assumed that the pipe wall roughness, radius and slope will yield an average velocity of 2 feet per second under circumstances with unrestricted flow and the pipe is half full. Thus, using the Flow Rate Equation, the area of flow may be calculated as follows:
$A_u$ = upstream flow area in ft$^2$/sec
$Q_A = V A_u$
$Q_A = 2$ ft/sec $A_u$, then
$A_u = Q_A/2$ Since $Q_A$ has been determined for each access point in the system, $A_u$ may be determined for each access point as well. Referring back to the flow geometry diagram of FIG. 4, the area of flow $A_u$ in a given pipe with radius R, the depth of flow h can be derived by performing a series of substitutions where:

As the value of h increases from 0.0 to the radius length, such that:

$$h => 0 \ldots R$$

using the formula for pipe geometry:

$$A_{test} \approx \frac{1}{2}\left(R * \sqrt{\left(2\sqrt{R^2 - d^2}\right)^2 + \frac{16}{3} * h^2} - 2\sqrt{R^2 - d^2} * d\right)$$

until:

$$A_{test} \approx A_U$$

Thus, referring back to the flow chart of FIG. 1, from an estimate of gallons generated by upstream customers for each access point 12, the anticipated depth of flow h may be derived for each access point 13. Once these calculations are performed for each access point, each access point may be listed with its anticipated flow depth h and anticipated flow rate $Q_A$ 11.

Figure 3:
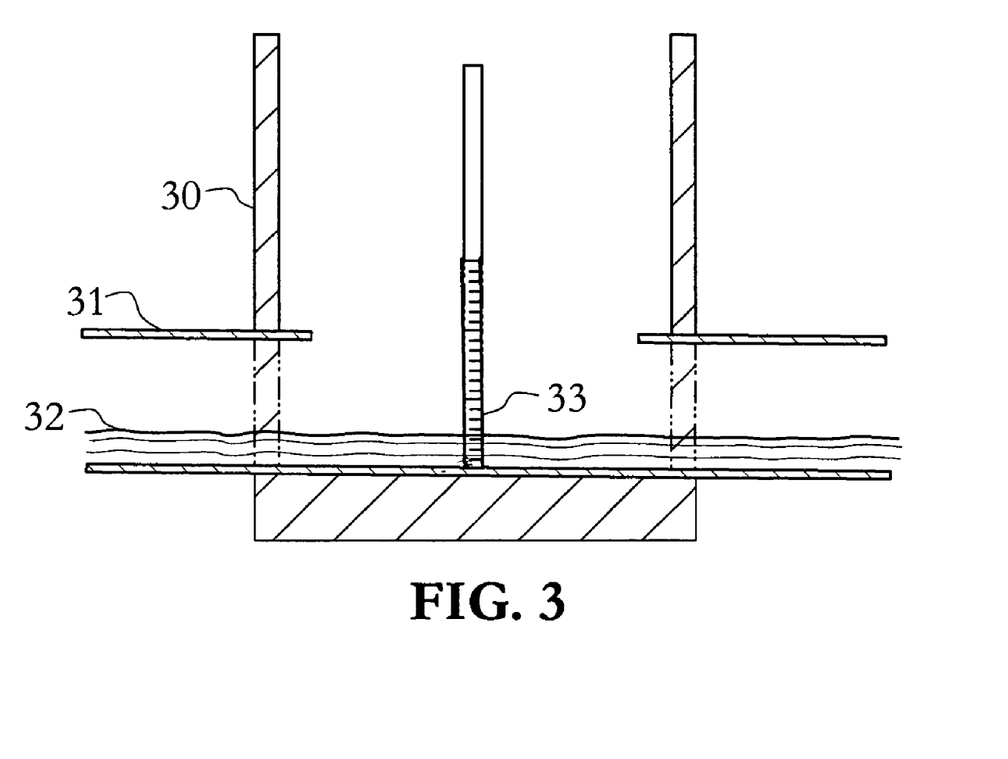
FIG. 3 is a profile view of an access point for a gravity-type sanitary sewer system with a depth of flow measurement device illustrated.

After anticipated flow depth and anticipated flow rate have been calculated, actual measurements may be taken to compare to these calculated figures. To complete this portion of the process, all access points are listed on a field worksheet 14. Then, the actual depth of flow is measured 15 at each access point 30, as shown in FIG. 3, although the measurement is preferably taken at the opening of the downstream pipe exiting the manhole. Although any number of measurement techniques are acceptable, a strip of kraft paper 33 is typically secured to one inch PVC pipe by adhesive or compressive means and dipped into deepest portion of flow at the access point 30. A water mark on the kraft paper indicates the depth of flow 32 in the pipe 31. A scale is provided on the disposable paper, which is preferably copied onto the paper with a thermal copier so that the ink does not smear when wetted. After the measurement is taken at the access point 30, the depth of flow is recorded on the field worksheet.

As an example, given the assumed flow velocity of 2 feet/sec, because the measured depth equals the radius of the pipe, the theoretical flow rate $Q_T$ may be calculated using the formulae noted above. From the previous discussion:

$$A \approx \frac{1}{2}\left(R * \sqrt{\left(2\sqrt{R^2 - d^2}\right)^2 + \frac{16}{3} * h^2} - 2\sqrt{R^2 - d^2} * d\right)$$

and:

$$Q = V A$$

$$V = 2 \text{ ft/sec}$$

then:

$$Q \approx 2 * \frac{1}{2}\left(R * \sqrt{\left(2\sqrt{R^2 - d^2}\right)^2 + \frac{16}{3} * h^2} - 2\sqrt{R^2 - d^2} * d\right)$$

-continued or:

$$Q \approx \left( R * \sqrt{\left(2\sqrt{R^2 - d^2}\right)^2 + \frac{16}{3} * h^2} - 2\sqrt{R^2 - d^2} * d \right)$$

Therefore, by simple measurement of the depth of flow, the theoretical flow rate $Q_T$ can be fairly estimated 16. The theoretical flow rate $Q_T$ may also be recorded and associated with the individual access points listed in 11. The actual flow depth may then be compared with the anticipated flow depth, and a ratio established between the anticipated flow rate $Q_A$ and the theoretical flow rate $Q_T$.

If the depth of flow measured during dry weather is appreciably higher than the depth estimated from upstream customers, it is reasonable to suggest that the downstream pipe performance is compromised. Depth of flow is a reliable predictor of downstream problems because the average flow velocity will typically remain relatively constant before and after an obstruction or other problem in underground pipes. However, the upstream height of flow will typically increase to overcome the obstacle.

Figure 5A:
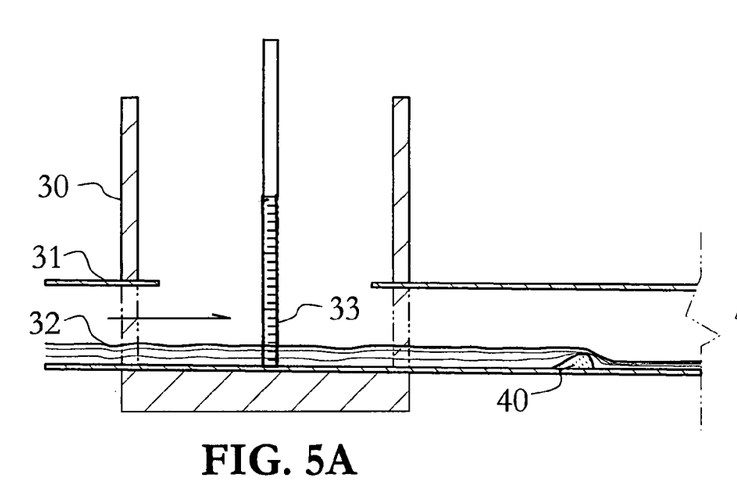
FIG. 5A is a profile view of an upstream access point on a gravity-type sanitary sewer system with a depth of flow measurement device and a pipe restriction illustrated.
Figure 5B:
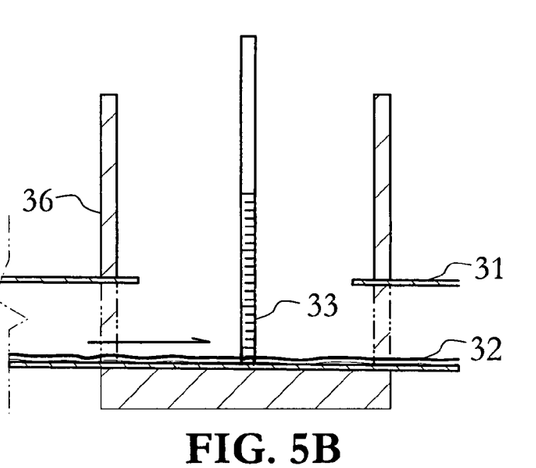
FIG. 5B is a profile view of an access point downstream from and associated with the access point shown in FIG. 5A.
Figure 6A:
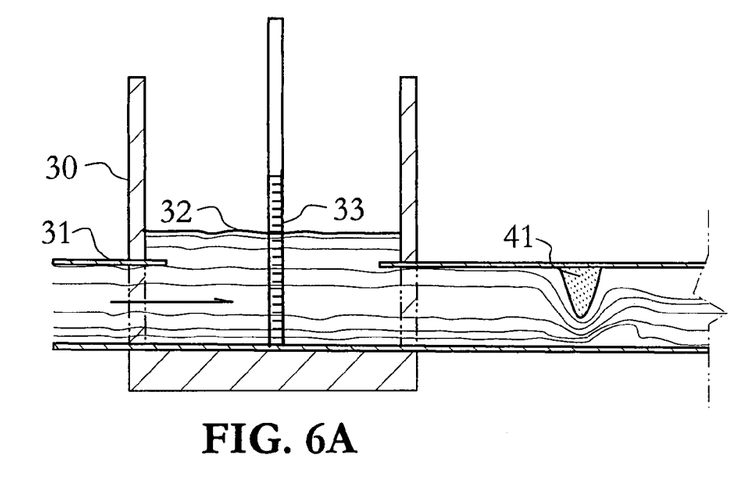
FIG. 6A is a profile view of an upstream access point on a gravity-type sanitary sewer system with a depth of flow measurement device and a pipe restriction illustrated.
Figure 6B:
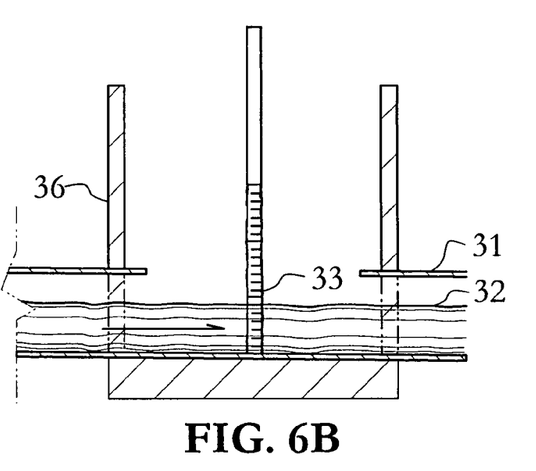
FIG. 6B is a profile view of an access point downstream from and associated with the access point shown in FIG. 6A.

As shown in FIG. 5A, the obstruction 40 will cause the level of flow 32 in the pipe 31 to increase upstream of the obstruction. This increased height of flow can be measured at the access point 30. When compared to the level of flow 32 downstream of the obstruction 40 at the downstream access point 36, as shown in FIG. 5B, the presence of the obstruction may be deduced. An obstruction 41 in the top of the pipe 31 may also cause the flow level 32 to rise, as shown in FIGS. 6A and 6B.

Figure 2:
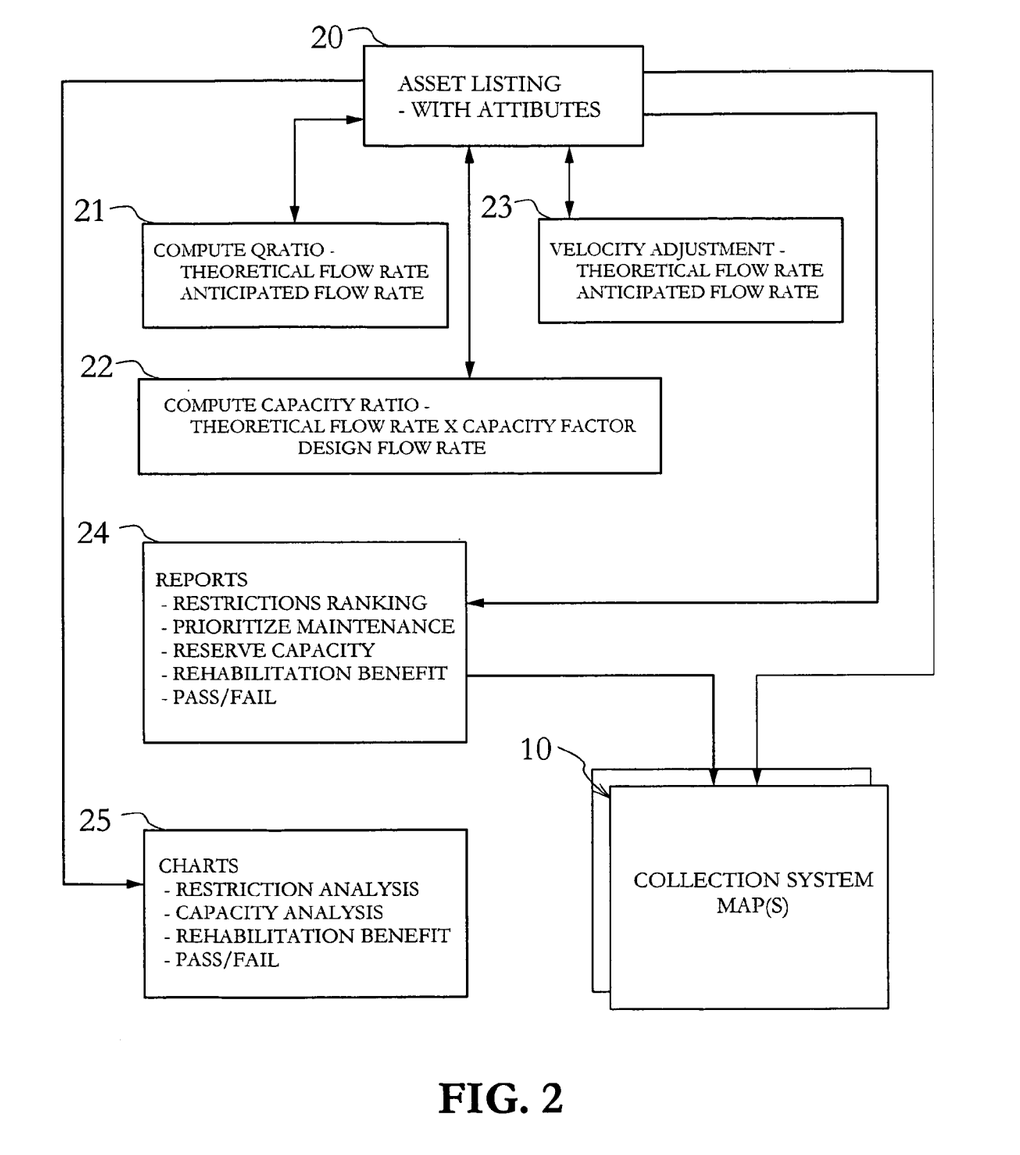
FIG. 2 is a block diagram illustrating the data computation and analysis portion of the present invention.

FIG. 2 illustrates the steps of the second portion of the inventive process of the present invention. Additional information may be computed, reported and charted to prioritize maintenance and rehabilitation efforts for the system.

To quantify and forecast whether potential problems such as those shown in FIGS. 5 and 6 may exist, a QRatio may be calculated by dividing the theoretical flow rate by the anticipated flow rate, as shown at step 21.

$$Q_T/Q_A = Q\text{Ratio}$$

where $Q_T$=flow rate derived by the measured flow depth
$Q_A$=flow rate derived from upstream sources As the QRatio increases at a particular access point, signifying that actual flow depth exceeds what one would expect from upstream sources, there is a greater potential for flow restrictions and blockages downstream of the access point.

To determine if comparisons are reasonable, the assumptions applied to arrive at the numbers compared must be evaluated, as shown at step 23. In this case, the anticipated flow computation uses an estimate of upstream sources $Q_A$, an estimated speed of flow V and the area of flow A within a given pipe size. The theoretical flow rate uses the same formulae to convert the actual flow depth to the theoretical flow rate. Both computations use the anticipated flow velocity in their respective computations. However, if the anticipated flow velocity and flow area is different because of diurnal flow variations, one would apply a different velocity value to both computations.

The data collected as described above may also be used to compute reserve conveyance capacity, or safety factor, as shown at step 22. In dry weather conditions, only a portion of the hydraulic capacity of the system is typically utilized. To estimate reserve capacity, which may be needed in the event of excessive wet weather and potential infiltration and inflow of storm water into the sanitary sewer system, a safety factor is used to compute the capacity potential for conveying extraordinary flows. If the area of flow measured in the field multiplied by the safety reserve factor is greater than the downstream pipe bore, the potential exists for the system to surcharge and potentially overflow during wet weather.

Design publications suggest safety factors on a sliding scale based on the size of pipe and the population served by the collection system. For purposes of describing the methodology of the present invention, the following factors are used:

$F_1$=300% main sewer reserve factor
$F_2$=250% trunk sewer reserve factor
$A_T$=theoretical flow area based on field depth of flow
$A_B$=bore area of the pipe Given the pipe diameter D, the bore of the pipe is represented as $A_B$ and calculated as follows:

$$A_B = (D/2)^2 \cdot \pi$$

The safety factor is then applied to the theoretical flow to arrive at $A_1$ for a main sewer and $A_2$ for a trunk sewer:

$$A_1 = F_1 A_T$$

$$A_2 = F_2 A_T$$

$A_1$ and $A_2$ may then be compared to the calculated bore area of the pipe to determine whether the reserve capacity is sufficient. If $A_1 > A_B$ for a main sewer or $A_2 > A_B$ for a trunk sewer, the reserve capacity is compromised. When this situation exists, management has persuasive information to make corrections as indicated by the comparison.

This comparison does not suggest that, during wet weather, the hydraulic reserve is sufficient to convey all ground water flows. When measurements are taken under wet weather conditions, inflow or infiltration may cause the flow area to increase along with the flow depth. It is recommended that the confirmation of reserve capacity be done with real life measurements performed under exceptional flow conditions. Further, the techniques of the present invention are not representative when downstream restrictions cause a pipe surcharge. If the flow depth is greater than the pipe diameter, in the absence of a velocity measurement in the center of the pipe flow, the surcharged depth will not reflect a true estimate of the flow rate. In this situation, for improved accuracy, it is best to take field measurements before surcharging occurs, in concert with velocity readings.

A method to rank pipe performance has considerable utility for the selective dispatch of maintenance crews when responding to potential problems. At least two ratios and a corresponding benchmark for each are provided that may guide management in prioritizing maintenance work, while, at the same time, providing a comprehensive overview of collection system performance.

The reserve capacity ratio $C_f$ is computed by dividing $A_1$ or $A_2$ by $A_B$:

$$C_f = A_1 \text{ or } A_2 / A_B$$

As the capacity factor $C_f$ approaches or passes 1.0, the potential for conveyance compromise increases during exceptional flow conditions.

Also, the QRatio compares the anticipated flow with the theoretical flow and offers insight about the flow performance well before capacity is compromised and conveyance performance is severe enough to warrant immediate preventative maintenance action. As the QRatio approaches or passes 2.0, the potential of a problem with downstream piping becomes more likely.

The collection of field measurements and anticipated flow estimates are also given meaning by comparison and association with other related information. Reports may be prepared, as illustrated in step 24 of FIG. 2. Maps, databases, and computational tools are employed in a variety of methods to aid management in the allocation of scare resources to address the maintenance and rehabilitation of the collection system.

Using formulae entered in typical spreadsheet programs or database programs, these computations are made with relative ease. By sorting QRatio values and capacity factors in ascending order, one can observe a high correlation of incidence between the two factors. Further exploration into the history of customer complaints, sewer backups, maintenance reports and overflow records incidental to the manholes with the highest QRatio will aid in weighting the severity of the problem and the potential for a future problem or overflow event to occur.

As the data for each location is individually analyzed, management is offered a basis to establish a policy for maintenance and/or rehabilitation. A similar method is created to weight the latency of new problems and a grading scale for proactive solutions. As restrictions are removed, and subsequent flow measurements made, it is possible to then determine the effectiveness of the corrective action and the cost benefit derived by the expenditure.

Figure 7A:
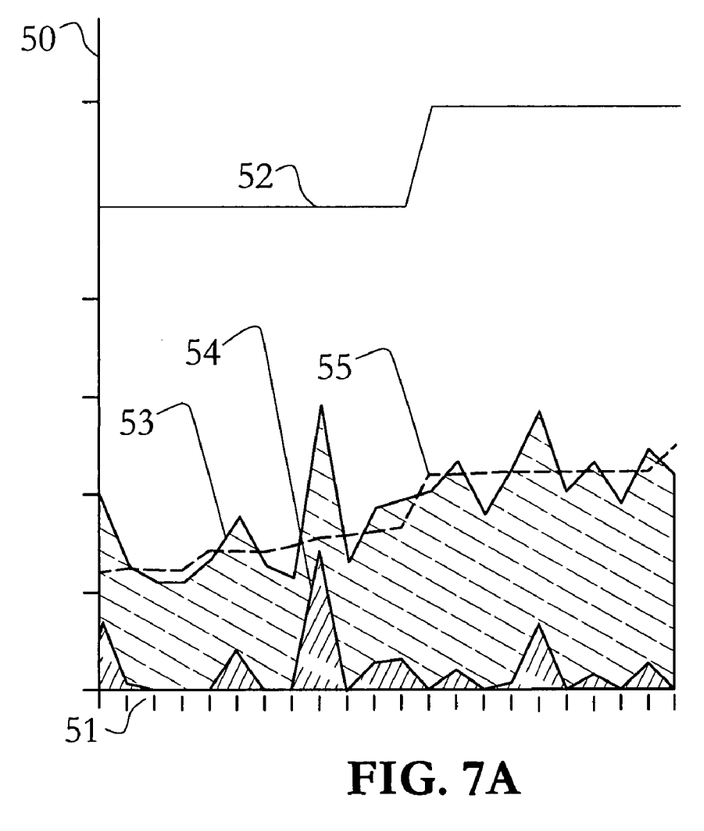
FIG. 7A is a chart illustrating the relationship of data derived from depth of flow measurements, anticipated flow estimates and the resulting assessment of flow impediments found along associated pipe segments in the sanitary sewer system.
Figure 7B:
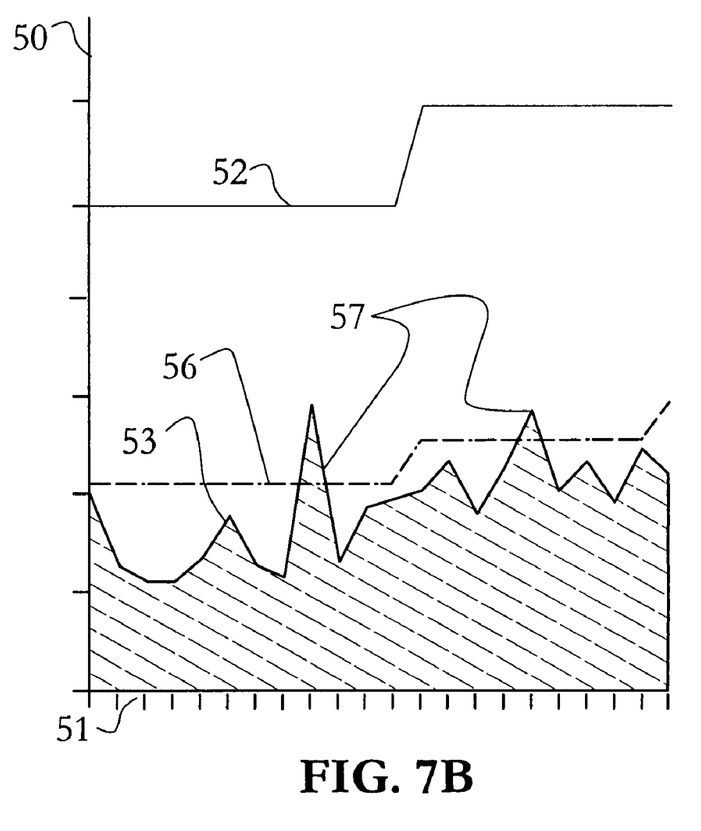
FIG. 7B is a chart illustrating the relationship of data derived from depth of flow measurements, idealized capacity goals and the resulting assessment of problem areas found along associated pipe segments in the sanitary sewer system.

Another evaluation tool is a simple charting of the numbers, as shown in step 25 of FIG. 2 and in FIGS. 7A and 7B. In FIG. 7A, flow depth 50 is charted in order down a trunk line or piping network at each access point 51. The line 52 represents the size of the pipe. The line 55 represents the anticipated flow converted to a depth of flow. The line 53 represents actual depth of flow based on field measurements. Portions of the pipeline where actual depth of the flow 53 exceeds anticipated flow 55 may be quickly identified from the graph and prioritized for further inspection and potential repair.

Also, as shown in FIG. 7B, actual depth of flow 53 may be easily compared with the size of the pipe 52, reduced to allow for the necessary safety factor 56. Further inspection, repair and maintenance may be focused on the access points 51 corresponding to the spikes 57 where actual depth of flow 53 exceeds the safety factor 56.

By use of actual data, the charts aid in visualizing what is occurring underground. For example, if the QRatio increases at a particular manhole, but then drops at the next manhole along the line, an obstruction will likely be found between the manholes. In this case, maintenance performed between the manholes will likely provide significant improvement in hydraulic performance. Such improvements can save significant resources where capacity is restored by maintenance or repair rather than construction of new lines.

In addition to determining the location of restrictions, the methods of the present invention can be used to prioritize maintenance scheduling and then later confirm the positive results. Cost benefits are realized because maintenance is deferred for areas without restrictions and scheduling is enhanced for portions of the system actually in need of attention.

The methodology described herein may also be used to evaluate and address infiltration and inflow of storm water into the sanitary sewer system. Inflow and infiltration may have a positive or negative effect on hydraulic performance. In large pipes with low flow, small amounts of ground water help to flush solids downstream. On the detrimental side, excessive wet weather flows may exceed the reserve capacity of the main to cause a surcharge or overflow. To evaluate these conditions, the measurements and evaluation techniques described herein can also be made during wet weather.

The process of the present invention can also be used to confirm removal of wet weather flows by rehabilitation. As wet weather flows are removed, hydraulic capacity is enhanced. By reviewing the history of measurements taken at the same monitoring location, the utility authority will have greater confidence that capacity is available for exceptional circumstances and/or future growth. These and other benefits of the present invention will be readily apparent to those of skill in the art.

Other alterations, variations, and combinations are possible that fall within the scope of the present invention. Although the preferred embodiment of the present invention has been described, those skilled in the art will recognize other modifications that may be made that would nonetheless fall within the scope of the present invention. Therefore, the present invention should not be limited to the apparatus and method described. Instead, the scope of the present invention should be consistent with the invention claimed below.

What is claimed is:

1. A method of evaluating a gravity-type flow conveyance system having a known geometry, the method comprising the steps of:
   identifying a plurality of access points in the hydraulic conveyance system;
   identifying all sources of flow input to the system upstream of each access point identified;
   quantifying the expected volume of flow input of each source identified;
   totaling the expected flow input from all sources identified upstream of each access point to compute an anticipated flow at each access point;
   measuring a depth of flow at each access point;
   converting the measured depth of flow to a volume of flow based on the known geometry of the system to compute a theoretical flow at each access point;
   comparing the anticipated flow to the theoretical flow at each access point to evaluate whether any restrictions on flow may exist in the conveyance system.

2. The method of claim 1, further including the steps of:
   assigning a ratio to each access point, the ratio being calculated by using the anticipated flow and the theoretical flow at each access point;
   ranking the access points based on the assigned ratios.

3. The method of claim 2, further including the step of prioritizing maintenance on the system based on the ranking of access points.

4. The method of claim 2 further including the step of inspecting portions of the system for restrictions based on the ranking of access points.

5. The method of claim 1 further including the step of inspecting portions of the system based on the comparison of the anticipated flow to the theoretical flow at each access point.

6. A method of evaluating a gravity-type flow conveyance system having a known geometry, the method comprising the steps of:

identifying a plurality of access points in the hydraulic conveyance system;

identifying all sources of flow input to the system upstream of each access point identified;

quantifying the expected volume of flow input of each source identified;

totaling the expected flow input from all sources identified upstream of each access point to compute an anticipated flow at each access point;

converting the anticipated flow to an anticipated depth of flow based on the known geometry of the system;

measuring an actual depth of flow at each access point;

comparing the anticipated depth of flow to the actual depth of flow at each access point to evaluate whether any restrictions on flow may exist in the conveyance system.

7. The method of claim 6, further including the steps of:

converting the actual measured depth of flow to a volume of flow based on the known geometry of the system to compute a theoretical flow at each access point;

assigning a ratio to each access point, the ratio being calculated by using the anticipated flow and the theoretical flow at each access point;

ranking the access points based on the assigned ratios.

8. The method of claim 7, further including the step of prioritizing maintenance on the system based on the ranking of access points.

9. The method of claim 7 further including the step of inspecting portions of the system for restrictions based on the ranking of access points.

10. The method of claim 6 further including the step of inspecting portions of the system based on the comparison of the anticipated flow to the theoretical flow at each access point.

* * * * *